United States Patent
Lee et al.

(10) Patent No.: US 9,581,935 B2
(45) Date of Patent: Feb. 28, 2017

(54) CRUM CHIP, IMAGE FORMING DEVICE FOR VERIFYING CONSUMABLE UNIT COMPRISING THE CRUM CHIP, AND METHODS THEREOF

(71) Applicant: Samsung Electronics Co., Ltd., Suwon-si (KR)

(72) Inventors: Jae-yoon Lee, Seongnam-si (KR); Hong-rok Woo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/204,250

(22) Filed: Mar. 11, 2014

(65) Prior Publication Data
US 2015/0110504 A1    Apr. 23, 2015

(30) Foreign Application Priority Data
Oct. 18, 2013 (KR) .................. 10-2013-0124823

(51) Int. Cl.
*G06F 21/33* (2013.01)
*G03G 15/08* (2006.01)
(Continued)

(52) U.S. Cl.
CPC ......... *G03G 15/0863* (2013.01); *G03G 15/55* (2013.01); *G06F 21/33* (2013.01); *G06F 21/44* (2013.01); *H04N 1/44* (2013.01)

(58) Field of Classification Search
CPC .... G03G 15/55; G03G 15/553; G03G 15/556; G06F 21/33; G06F 21/44; H04N 1/44
See application file for complete search history.

(56) References Cited

U.S. PATENT DOCUMENTS 8,532,506 B2    9/2013  Jones et al.
2012/0134686 A1*  5/2012  Jones et al. ............... 399/12
(Continued)

FOREIGN PATENT DOCUMENTS

EP         2250602        11/2010
KR     10-2001-0049000     6/2001
(Continued)

OTHER PUBLICATIONS

Extended European Search Report dated Mar. 4, 2015 in European Patent Application No. 14181034.1.
(Continued)

*Primary Examiner* — Clayton E Laballe
*Assistant Examiner* — Ruifeng Pu
(74) *Attorney, Agent, or Firm* — Staas & Halsey LLP

(57) ABSTRACT

Provided herein is an image forming device including a main body; a consumable unit detachable from and attachable to the main body, and including a CRUM chip; a storage which stores a detection list including information on counterfeit CRUM chips and a conversion serial information list including a plurality of conversion serial information each of which is converted from serial information stored in the CRUM chip according to a plurality of different predetermined rules; and a controller to limit use of the consumable unit, when verifying the consumable unit based on at least one of the detection list and the conversion serial information list fails.

26 Claims, 14 Drawing Sheets

(51) Int. Cl.
 *H04N 1/44* (2006.01)
 *G03G 15/00* (2006.01)
 *G06F 21/44* (2013.01)

(56) References Cited

U.S. PATENT DOCUMENTS

| | | |
|---|---|---|
| 2012/0134687 A1 | 5/2012 | Jones et al. |
| 2012/0254050 A1 | 10/2012 | Scrafford et al. |
| 2013/0155459 A1 | 6/2013 | Jeong et al. |
| 2014/0281527 A1* | 9/2014 | Kobres .................. G06F 21/44 |
| | | 713/168 |

FOREIGN PATENT DOCUMENTS

| | | |
|---|---|---|
| KR | 10-2007-0075101 | 7/2007 |
| KR | 10-2009-0101771 | 9/2009 |
| KR | 10-2012-0059387 | 6/2012 |
| KR | 10-2013-0085554 | 7/2013 |
| WO | 2009/110692 | 9/2009 |

OTHER PUBLICATIONS

International Search Report and Written Opinion of the International Searching Authority dated Dec. 22, 2014 in International Patent Application No. PCT/KR2014/006877.
Korean Office Action dated Jun. 15, 2015 in Korean Patent Application No. 10-2013-0124823.

* cited by examiner

FIG. 9

| User | CSN | TSN | IBL1 | IBL2 | ... | IBLx |
|---|---|---|---|---|---|---|
| PRINTER 1 | 12345 | 12345678901 | 689304 | 784526 | ... | 123122 |
| PRINTER 2 | 67890 | 68345231678 | 689304 | 357423 | ... | 9522791 |
| PRINTER 3 | 34567 | 23567078967 | 689304 | 234721 | ... | 5660505 |
| ... | ... | ... | ... | ... | ... | ... |
| PRINTER M | 99082 | 32023065645 | 689304 | 408327 | ... | 4181487 |

CRUM CHIP, IMAGE FORMING DEVICE FOR VERIFYING CONSUMABLE UNIT COMPRISING THE CRUM CHIP, AND METHODS THEREOF

CROSS-REFERENCE TO RELATED APPLICATIONS

This application claims priority benefit from Korean Patent Application No. 10-2013-124823, filed in the Korean Intellectual Property Office on Oct. 18, 2013, the disclosure of which is incorporated herein by reference.

BACKGROUND

1. Field

Embodiments of methods and apparatuses relate to an image forming device configured to verify a consumable unit using at least one of a detection list and a conversion serial information list and a verifying method thereof.

2. Description of the Related Art

Due to the development of electronic technologies, various types of electronic devices are being developed and provided. Especially, as computer propagation has been popularized, the supply rate of computer peripherals is also increasing every day. Computer peripherals refer to devices for improving the utility of computers. For example, image forming devices such as printers, scanners, copiers, and multifunction peripherals may be computer peripherals.

An image forming device is a device configured to perform an image forming job of forming an image on paper or other medium. In order to perform an image forming job, a developer such as ink or toner may be used. In the case of a laser type image forming device which uses toner, an electric charge unit, developing unit, transcription unit, light exposure unit, and settlement unit etc. are used. Such units that are consumed as jobs are performed may be called consumable units. After using such a consumable unit for a certain period of time, characteristics of the consumable unit would change, and thus it is difficult to expect good printing quality. Especially, in the case of a toner cartridge which contains toner, when the toner runs out, there may be times when the toner cartridge must be replaced. In preparation for such cases, product manufacturers sell consumable units separately from complete products. An image forming device may form the best quality images when mounted with such genuine consumable units.

However, there is possibility of installing a consumable unit that is not suitable to the image forming device or a nongenuine (counterfeit) consumable unit with low quality. Furthermore, when a malicious third party sells a nongenuine consumable unit having poor quality which is a copy of a genuine consumable unit, there is possibility of using the nongenuine consumable unit. However, when a nongenuine consumable unit is fitted (installed) in an image forming device, operations of the image forming device may not be made properly, or what is even worse is that the image forming device may be damaged by the nongenuine consumable unit. An image forming device uses high temperature and high pressure in the process of performing a job, and thus there is also possibility of fire or explosion due to using a nongenuine consumable unit.

In order to prepare against such risks, memories are being fitted onto consumable units that are to be mounted onto image forming devices, the memories for performing processes of authenticating consumable units. However, if a third party having malicious purposes analyzes the code protocol and encoded key by hacking the memory fitted to (installed in) a consumable unit or the memory of main body of the image forming device, the third party could make a nongenuine consumable unit where authentication is made properly.

Accordingly, in addition to prior art processes, there requires a technology for verifying a consumable unit appropriately.

SUMMARY

In an aspect of one or more embodiments, there is provided methods and apparatuses to resolve the aforementioned problems, that is to provide a method for preventing manipulating risk regarding a consumable unit by verifying the consumable unit using at least one of a detection list and conversion serial information list.

According to an exemplary embodiment of the present disclosure, there is provided a CRUM chip including a memory configured to store a detection list including information on nongenuine CRUM chips, serial information, and a conversion serial information list including a plurality of conversion serial information (pieces of conversion serial information) converted from the serial information according to a plurality of different predetermined rules; an interface for performing communication with a controller fitted inside a main body of an image forming device; and a central processing unit (CPU) configured to provide the detection list and the conversion serial information list to the controller of the main body.

The conversion serial information list may further include a trigger bit to designate at least one piece of conversion serial information to be used in verifying among the pieces of conversion serial information.

In addition, the detection list may include at least one of toner serial information, chip serial information, and serial number of the nongenuine (counterfeit) CRUM chips, data recorded in a certain address inside a CRUM memory, and random data used during authentication.

According to an exemplary embodiment of the present disclosure, there is provided an image forming device including a main body; a consumable unit, which is detachable from the main body and attachable to the main body, and including a CRUM chip; a storage which stores a detection list including information on nongenuine CRUM chips (information about counterfeit CRUM chips) and a conversion serial information list including a plurality of conversion serial information each of which is converted from serial information stored in the CRUM chip according to a plurality of different predetermined rules; and a controller configured to limit use of the consumable unit, when verifying the consumable unit based on at least one of the detection list and the conversion serial information list fails.

The CRUM chip includes a storage which stores the serial information, the detection list, and the conversion serial information; and a CPU configured to provide the detection list and the conversion serial information list to the controller, when the consumable unit is fitted to (installed in) the main body, and the controller stores the detection list and the conversion serial information list provided from the CPU to the storage.

In addition, the controller may check a version of the detection list stored in the CPU, and if the version is a latest version than a detection list prestored in the storage, requests the CPU for a list transmission, and when the detection list is provided from the CPU according to the request, updates the list stored in the storage.

In addition, the conversion serial information list may further include a trigger bit for designating at least one conversion serial information to be used in the verifying among the plurality of conversion serial information.

In addition, the controller may authenticate the CRUM chip according to a predetermined authentication algorithm when the consumable unit is fitted to the main body, check whether or not the CRUM chip is a CRUM chip registered in the detection list if the authentication succeeds, and perform a first verifying of the CRUM chip, and if the CRUM chip is a CRUM chip not registered in the detection list, download the conversion serial information from the CRUM chip, check the trigger bit, select at least one conversion serial information among the conversion serial information list, convert the serial information of the CRUM chip according to rules corresponding to the selected conversion serial information, compare a converted result value and the selected conversion serial information, and perform a second verifying of the CRUM chip.

In addition, if the detection list version of the CRUM chip is a latest version than the detection list stored in the storage, the controller may download the detection list from the CRUM chip and update the detection list stored in the storage and check whether or not serial information of the CRUM chip is registered in the updated detection list and performs a first verifying of the CRUM chip, and if the CRUM chip is a CRUM chip not registered in the detection list, download the conversion serial information list from the CRUM chip, check the trigger bit, select at least one conversion serial information among the conversion serial information list, convert the serial information of the CRUM chip according to rules corresponding to the selected conversion serial information, compare a converted result value and the selected conversion serial information, and perform a second verifying of the CRUM chip.

According to an exemplary embodiment of the present disclosure, the image forming device may further include a communicator for performing communication with a server apparatus. In this case, the controller may transmit at least one of the serial information, the detection list, and the conversion serial information list provided from the CRUM chip to the server apparatus as a result of verifying the consumable unit.

In addition, the image forming device may further include a communicator configured to perform communication with a server apparatus, the controller may receive the detection list and the conversion serial information list from the server device and store at the storage unit.

In addition, the detection list may include at least one of toner serial information, chip serial information, and serial number of the nongenuine CRUM chips, data recorded in a certain address inside a CRUM memory, and random data used during authentication.

According to an exemplary embodiment of the present disclosure, there is provided a consumable unit verifying method of an image forming device where a consumable unit including a CRUM chip may be attached thereto and detached therefrom, the method including verifying the consumable unit based on at least one of a detection list including information on nongenuine CRUM chips and a conversion serial information list including a plurality of conversion serial information each of which is converted from serial information stored in the CRUM chip according to a plurality of different predetermined rules; and limiting use of the consumable unit, when the verifying the consumable unit fails.

In addition, the method may further include receiving the serial information, the detection list, and the conversion serial information list from the CRUM chip; and storing the detection list and the conversion serial information list in a main body of the image forming device.

In addition, the method may further include checking a version of the detection list stored in the CPU, and if the version is a latest version than a detection list prestored in the main body of the image forming device and requesting the CPU for a list transmission; and when the detection list is provided from the CPU according to the request, updating the detection list prestored in the main body of the image forming device.

The conversion serial information list may further include a trigger bit configured to designate at least one among the plurality of different rules.

In addition, the method may further include performing verifying the CRUM chip according to a predetermined authentication algorithm when the consumable unit is fitted to the main body. The verifying the consumable unit may be performed after the authentication succeeds.

In addition, the verifying the CRUM chip may include if the detection list version of the CRUM chip is a latest version than a detection list prestored in the main body of the image forming device, downloading the detection list from the CRUM chip and updating the prestored detection list; performing a first verifying of the CRUM chip by checking whether or not serial information of the CRUM chip is registered in the updated detection list; if the CRUM chip is a CRUM chip not registered in the updated detection list, downloading the conversion serial information list from the CRUM chip; selecting at least one conversion serial information among the conversion serial information list by checking the trigger bit; converting the serial information of the CRUM chip according to rules corresponding to the selected conversion serial information; and performing a second verifying the CRUM chip by comparing a converted result value and the selected conversion serial information.

In addition, the method may further include transmitting at least one of the serial information, the detection list and the conversion serial information list from the CRUM chip as a result of verifying the consumable unit.

In addition, according to an exemplary embodiment of the present disclosure, there is provided a server apparatus including a server communicator configured to perform communication with a plurality of image forming devices; a database configured to store nongenuine (counterfeit) management information; and a server controller configured to receive a verification result and update the nongenuine management information when the verifying the consumable unit is performed in each of the plurality of image forming devices. The image forming device may verify the CRUM using at least one a detection list including information on nongenuine CRUM chips and a conversion serial information list including a plurality of conversion serial information converted from the serial information according to a plurality of different predetermined rules.

According to an aspect of one or more embodiments, there is provided at least one non-transitory computer readable medium storing computer readable instructions to implement methods of embodiments when executed by at least one processing element.

According to the aforementioned various exemplary embodiment of the present disclosure, it is possible to verify a consumable unit using at least one of a detection list and a conversion serial information list.

BRIEF DESCRIPTION OF THE DRAWINGS

The above and/or other aspects of the present disclosure will be more apparent by describing certain present disclosure with reference to the accompanying drawings, in which:

FIG. 9 is a view illustrating an example of a database table managing a server apparatus;

DETAILED DESCRIPTION

Figure 1:
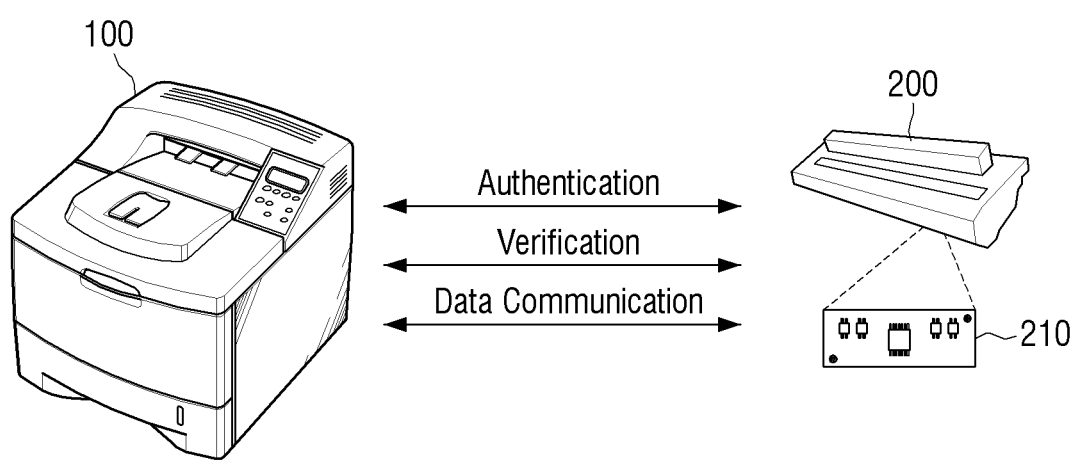
FIG. 1 is a view for explaining operations of an image forming device according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view for explaining a consumable unit authenticating method of an image forming device according to an exemplary embodiment of the present disclosure.

The image forming device 100 may perform an image forming job using at least one consumable unit 200. The consumable unit 200 may be freely attached to and detached from a main body of the image forming device 100.

In FIG. 1, for simplicity of explanation, it is illustrated that the consumable unit 200 is separated from the main body, but in fact, communication between the main body and the consumable unit 200 may be made with the consumable unit 200 fitted to (installed in) the main body.

That is, when the consumable unit 200 is fitted, the image forming device 100 may perform various operations such as authentication, verification and data communication etc. between the image forming device 100 and the CRUM chip 210 fitted (installed) inside the consumable unit 200.

Authentication refers to checking whether or not the CRUM chip 210 fitted inside the consumable unit 200 is an effective chip, and creating a common section key for safe communication. Authentication may be made by various configurative elements. For example, authentication may be made by software by the CPU inside the image forming device 100 executing firmware. Otherwise, if there is an ASIC (Application Specific Integrated Circuit) separately formed inside the image forming device 100 for authentication, authentication may be executed by hardware using the ASIC. An authenticating method may be embodied in various ways as well. Authenticating methods will be explained in detail hereinafter.

When authentication of the CRUM chip 210 is completed, the image forming device 100 may perform a verifying operation of checking whether or not the CRUM chip 210 or consumable unit 200 is a genuine one. Verifying may be performed on the CRUM chip 210, or the consumable unit 200 having the CRUM chip 210 installed therein, but for simplicity of explanation hereinafter the explanation is based on the assumption that the verifying is made on the consumable unit 200. In addition, although in FIG. 1 it is illustrated that a verifying operation is made after authentication, but verifying operation may precede the authentication or may be included in the authentication process.

Verifying may be made in various ways depending on exemplary embodiments. According to an exemplary embodiment, the image forming device 100 may verify the consumable unit 200 based on a detection list. The detection list may refer to a list of serial information that has been determined to require additional action after checking the conformity and integrity of record information inside the CRUM memory for safe and normal authenticating of the consumable unit.

In addition, the detection list may refer to data including information on nongenuine (counterfeit) CRUM chips. Various serial information that may discern nongenuine (counterfeit) CRUM chips may be registered in the detection list. If serial information on the consumable unit 200 or CRUM chip 210 is already registered in the detection list, the image forming device 100 may determine that the corresponding consumable unit 200 is nongenuine and limit using the corresponding consumable unit 200.

The detection list may be provided from various source. For example, the detection list may be stored in an image forming device 100 before the image forming device 100 is placed in the stream of commerce (placed in the market place). Otherwise, the detection list may also be newly modified when inserting the detection list into a new firmware of the image forming device 100 to update a program of the image forming device 100. By another example, the image forming device 100 may be provided with a detection list from the CRUM chip 210. In this case, when the detection list is updated, in the CRUM chip 210 produced thereafter, the updated detection list may be stored. Accordingly, the image forming device 100 where a consumable unit has been replaced by the consumable unit having the corresponding CRUM chip 210 becomes capable of receiving the updated detection list.

According to an exemplary embodiment, the image forming device 100 may verify the consumable unit 200 based on a conversion serial information list. The conversion serial information list refers to data including pieces (portions, items, or units) of conversion serial information (a plurality of conversion serial information) converted from serial information of the CRUM chip 210 or the consumable unit 200 according to a plurality of predetermined different rules. rules refer to rules determined to convert the serial information of the CRUM chip 210 or consumable unit 200 into another value. For example, if in the case where the serial number of the consumable unit 200 is 1234567890, the first rule is to shift each value to the right, the first conversion serial information would be 0123456789. In addition, if in the case where the second rule is to shift the values to the left, the second conversion serial information would be 2345678901. In addition, if the third rule is to change the location of the third value and the seventh value among the entire values, the third conversion serial information would be 1274563890. Therefore, if the serial number is considered serial information, the conversion serial information created based on that serial number is also serial information.

The image forming device 100 converts the serial information of the consumable unit 200 using the rule used in the conversion serial information list, and compares the converted value with the corresponding value inside the conversion serial information list. If the converted value is identical to the corresponding value inside the conversion serial information list, the consumable unit 200 may be determined as a genuine product, and if not, a nongenuine produce.

The comparison may also be made by converting into the serial information of the consumable unit in reverse using the conversion serial information and mathematical formulas, and then comparing the converted value with the serial information of the consumable unit.

According to an exemplary embodiment, the image forming device 100 may perform a verifying operation using all the detection list and conversion serial information list. In this case, the checking order may be determined in any way.

When verifying the consumable unit 200 is completed, the image forming device 100 determines that the consumable unit 200 is usable. Accordingly, when necessary, the image forming device 100 may perform data communication with the consumable unit 200.

For example, at a waiting state, when an event for starting an image forming device occurs, the image forming device 100 performs an image forming job using the consumable unit 200. In addition, various information such as the developer information, job information, job execution time, developer usage amount, number of printed pages etc. consumed in the image forming job is transmitted to the consumable unit 200. The CRUM chip 210 stores the transmitted information to its memory.

Figure 2:
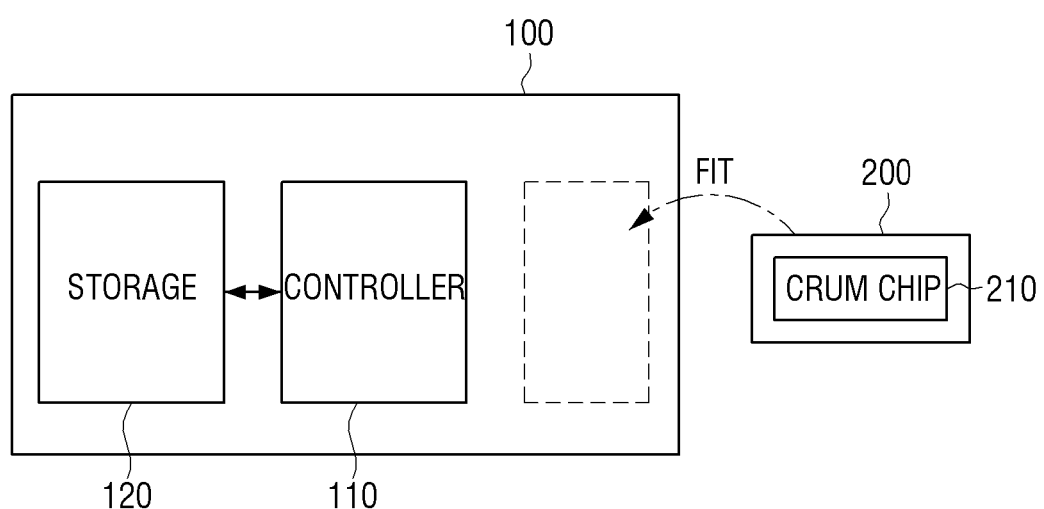
FIG. 2 is a block diagram for explaining a configuration of an image forming device according to an exemplary embodiment.

FIG. 2 is a block diagram illustrating a configuration of an image forming device according to an exemplary embodiment of the present disclosure. According to FIG. 2, the image forming device 100 includes a consumable unit 200, storage 120, and main controller 110.

The consumable unit 200 may be an independent unit that may be attached to and detached from a main body of the image forming device 100. For example, in the case where the image forming device 100 is a laser printer using toner, the consumable unit 200 may be various configuration elements such as an electric charge unit, developing unit, transcription unit, light exposure unit, and settlement unit etc. Each consumable unit 200 may include a CRUM chip 210.

The storage 120 is a configurative element for storing various programs and data necessary for operating the image forming device 100. For example, in the storage 120, a detection list and conversion serial information list may be stored. The detection list and the conversion serial information list may be recorded in the storage 120 in the manufacturing process before the image forming device 100 is put to market or may be downloaded from the consumable unit 200 and be recorded in the storage 120 when the consumable unit 200 is initially fitted or replaced. Otherwise, data may be changed during updating programs of the image forming device 100.

The controller 110 may verify the consumable unit based on at least one among the detection list and conversion serial information list stored in the storage 120.

When the verification succeeds, the controller 110 determines that the corresponding consumable unit 200 is usable, and falls into a waiting state. On the other hand, if the verification fails, the controller 110 limits the use of the corresponding consumable unit 1200 or perform the predetermined operations at the corresponding state, and output an error message through a display (not illustrated) or speaker (not illustrated) etc.

Figure 3:
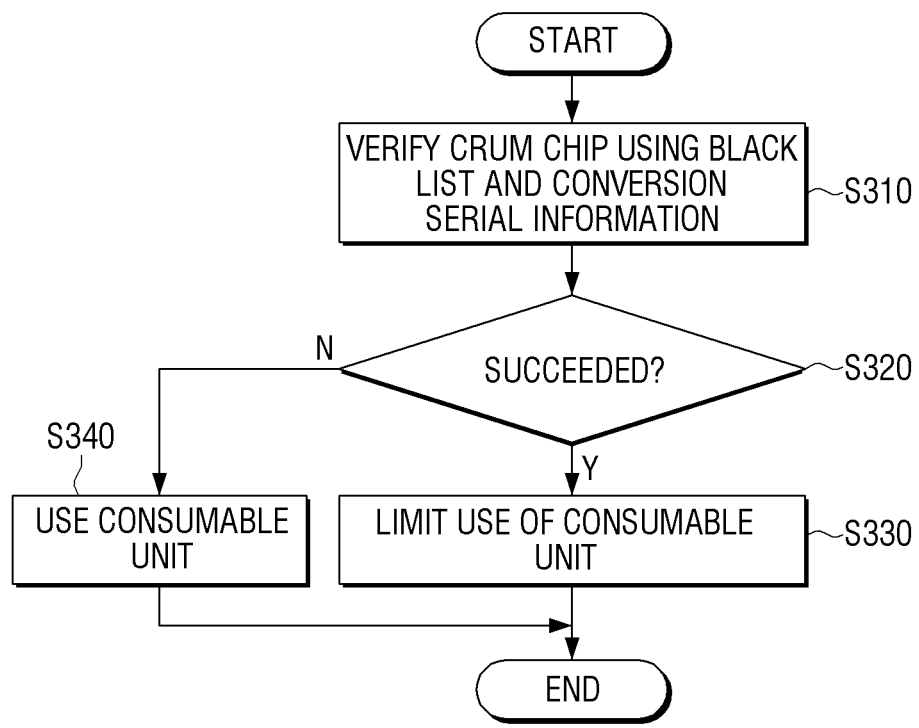
FIG. 3 is a flowchart for explaining a consumable unit verifying method of an image forming device according to an exemplary embodiment.

FIG. 3 is a flowchart for explaining a consumable unit verifying method of an image forming device according to an exemplary embodiment of the present disclosure. According to FIG. 3, when the consumable unit including a CRUM chip is fitted to the main body of the image forming device 100, the image forming device 100 may verify the consumable unit based on at least one of the detection list and the conversion serial information list (S310).

More specifically, in the case of using the detection list, the controller 110 checks the serial information of the consumable unit 200, and checks whether or not that serial information is registered in the detection list. If it is checked that the serial information is registered in the detection list, it is determined that the verification failed (S320). Accordingly, using the corresponding consumable unit is limited (S340). On the other hand, when it is checked that the serial information is not registered in the detection list, it is determined that the verification succeeded (S320). Accordingly, using the consumable unit is allowed (S330).

In the case where the conversion serial information list is used, the controller 110 may read all the conversion serial information list stored in the CRUM chip 210 and store the read conversion serial information list in the storage 120. According to exemplary embodiments, an aptitude test may be performed first regarding whether or not there is any problem in the conversion serial information list before storing it in the storage. For example, in the conversion serial information list, a check sum value, hash value or certain rule data may be included. If the conversion serial information does not correspond to such data, the controller may regard the conversion serial information as conversion serial information created by a $3^{rd}$ party or waste data initially contained in the chip, and process it to be a verification failure. Accordingly, it may be processed as not printable or an error message may be displayed on the UI.

When there is no problem in the conversion serial information list in the first place, the controller 110 may perform verification based on the conversion serial information list. For example, the conversion serial information list may include a trigger bit and conversion serial information data. The trigger bit is a bit for designating the conversion serial information to be used in verification. For example, in the case where a total of 20 pieces of conversion serial information are registered, the trigger bit may be embodied as 20 bits. Each trigger bit may be recorded as 0 or 1. The controller 110 may selectively perform verification regarding the conversion serial information only. For example, if a first conversion serial information (first piece of conversion serial information) is designated by the trigger bit, the controller 110 converts the serial information according to the first rule. The controller 110 compares the converted result value with the first piece of conversion serial information inside the conversion serial information list. If the converted result value is identical to the first piece of conversion serial information, it is processed to be a verification success, and if not, a verification failure (S320).

If there are a plurality of trigger bits having 0 value, the controller 110 of the image forming device 100 may verify all conversion serial information corresponding to each trigger bit and verify the consumable unit.

When the verification on each trigger bit having 0 value is completed successfully, the controller 110 may determine that the consumable unit 200 is usable. On the other hand, if the verification failed, the controller 110 may limit using the corresponding consumable unit (S340), and output various error messages. In this example, it is embodied to verify the corresponding conversion serial information when the trigger bit included in the serial information list is 0, but it may also be embodied to verify the corresponding conversion serial information when the trigger value is 1 and not to verify the corresponding conversion serial information when the trigger value is 0.

Figure 4:
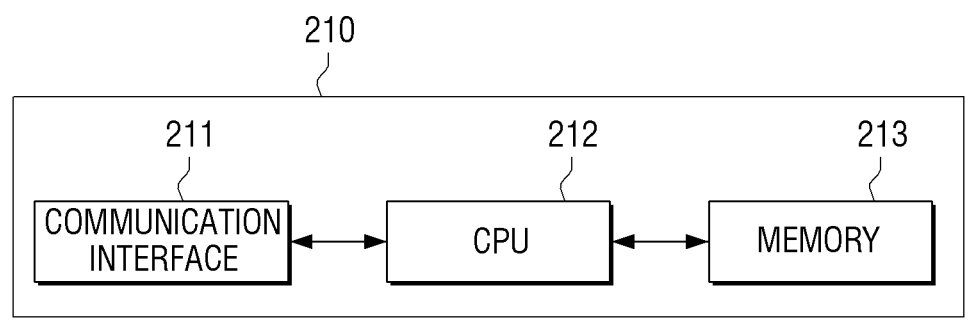
FIG. 4 is a block diagram for explaining a configuration of a CRUM chip according to an exemplary embodiment.

FIG. 4 is a block diagram illustrating a configuration of a CRUM chip according to an exemplary embodiment of the present disclosure. According to FIG. 4, the CRUM chip 210 includes a communication interface 211, CPU 212, and memory 213.

The communication interface 211 is a configurative element for performing communication with the main body of the image forming device 100. More specifically, the communication interface 211 may perform communication with the controller 110 inside the main body using various communication methods such as GPUI, 12C, and RFID etc. For example of 12C, the communication interface 211 may be connected to the controller via a VCC and GND that supply power, an SCL that supplies clock for synchronization and an SDA that is a dataline etc. Besides, the communication interface 211 may perform communication with the controller 110 according to wireless communication standards such as blue tooth, Wifi, Zigbee, and NFC (Near Field Communication) etc.

The memory 213 is a configurative element for storing various information and programs related to the consumable unit. More specifically, in the memory 213, various information such as serial information, and use information may be recorded. Serial information refers to information for discerning the consumable unit 200 or CRUM chip 210. For example, information on the manufacturer of the consumable unit 200, information on the manufacturer of the image forming device, name of apparatuses that may be fitted to the image forming device, toner serial information, chip serial information, serial number, information on the manufacturing date, model name, electronic signature information, encoded key, and encoded key index etc. may be included. Serial information may be called as feature information or identification information instead. Use information refers to information related to the use state of the consumable unit. More specifically, use information may include information on how many sheets have been printed using the consumable unit, how many more sheets can be printed using the consumable unit, and how much toner is left etc.

Besides, not only general information such as the version, serial number, set model name, and service starting date etc. of the consumable unit 200 but also various option information such as RAM size and EEPROM size, information related to life span of the consumable unit, feature information of the consumable unit, features of the consumable unit, color menus, and set up menus etc. may be stored in the memory 213.

In addition, in the memory 213, various programs that may be executed by the CPU 212 may be stored. More specifically, in the program to be stored in the memory 213, not only general applications but also O/S (Operating System) program, initialization program, encoding program may be included. These O/S program, or initialization program, encoding program may be provided separately from the O/S program or initialization program, encoding program used in the main body of the image forming device 100 and be stored in the memory 213.

In the case where the CRUM chip is embodied to have an O/S of its own, the CPU 212 may perform authentication using the O/S between the CPU 212 and the main body of the image forming device 100. More specifically, when an authentication event occurs, the CPU 212 performs authentication between the CPU 212 and the controller 110. An authentication event refers to a state where a condition requiring authentication of the consumable unit has been satisfied, more specifically, when the image forming device 100 has been turned off and then turned on, or when an image forming job has ended, or when the consumable unit has been replaced. Otherwise, arrival of a predetermined time period may also be included in the authentication even.

A detection list and conversion serial information list as aforementioned may be stored in the memory 213. According to exemplary embodiments, both or either of the detection list and conversion serial information list may be stored in the memory 213. In the case where the detection list and conversion serial information list are both stored in the memory 213, the CPU 212, when authentication is completed, may provide the detection list and the conversion serial information list stored in the memory 213 to the controller 110.

Figure 5:
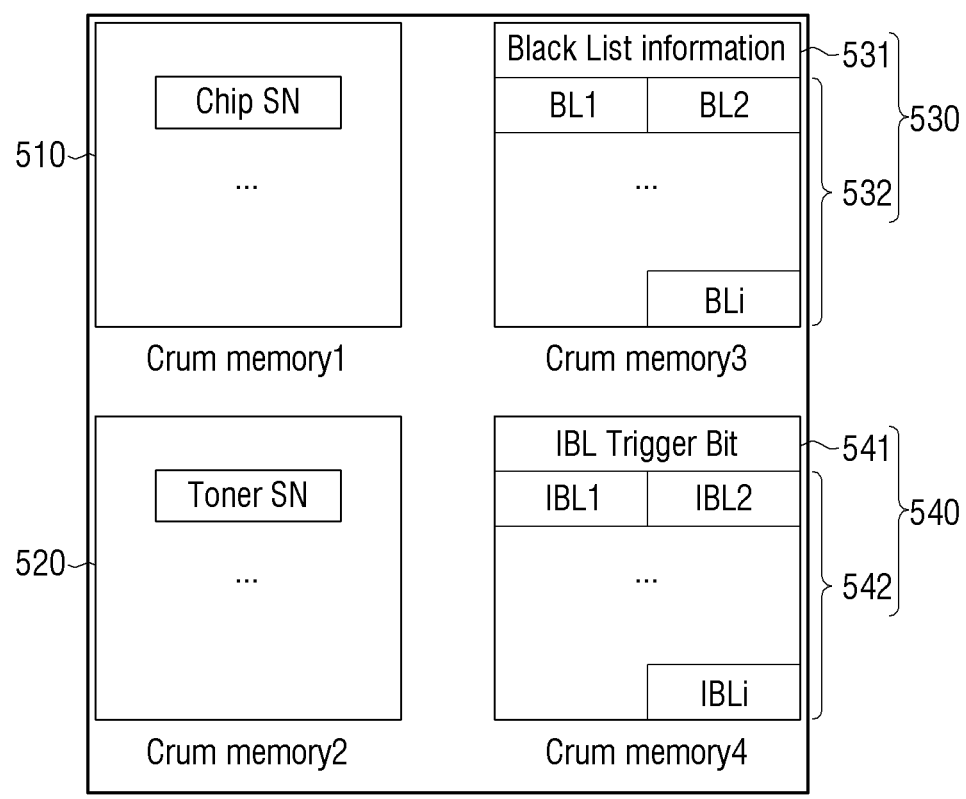
FIG. 5 is a view illustrating an example of a data structure of a data stored in a CRUM.

FIG. 5 is a view illustrating an example of a memory structure of a memory included in a CRUM chip 210. According to FIG. 5, the memory 213 may be divided into a plurality of storage areas 510, 520, 530, 540. Each storage area 510, 520, 530, 540 may store various designated data. For example, there may be provided an area storing chip serial number 510, area storing toner serial number 520, area storing detection list 530, and area storing conversions serial information list 540 etc.

In the detection list area 530, header information 531 for identifying that detection list area, and various serial information 532 used in a prediscovered nongenuine produce may be recorded. In addition, a check sum value for checking the legitimacy of the corresponding detection list, or hash value or certain rule data may be recorded together in the detection list area 530.

In the conversion serial information list area 540, a trigger bit 541, and a plurality of conversion serial information (pieces of conversion serial information) 542 may be recorded. As aforementioned, a check sum value for checking the legitimacy of the corresponding detection list, or hash value or certain rule data may be recorded together in the conversion serial information list area 530.

According to an exemplary embodiment of the present disclosure, the image forming device may check the version of the detection list recorded in the CRUM chip 210 and update the detection list.

Figure 6:
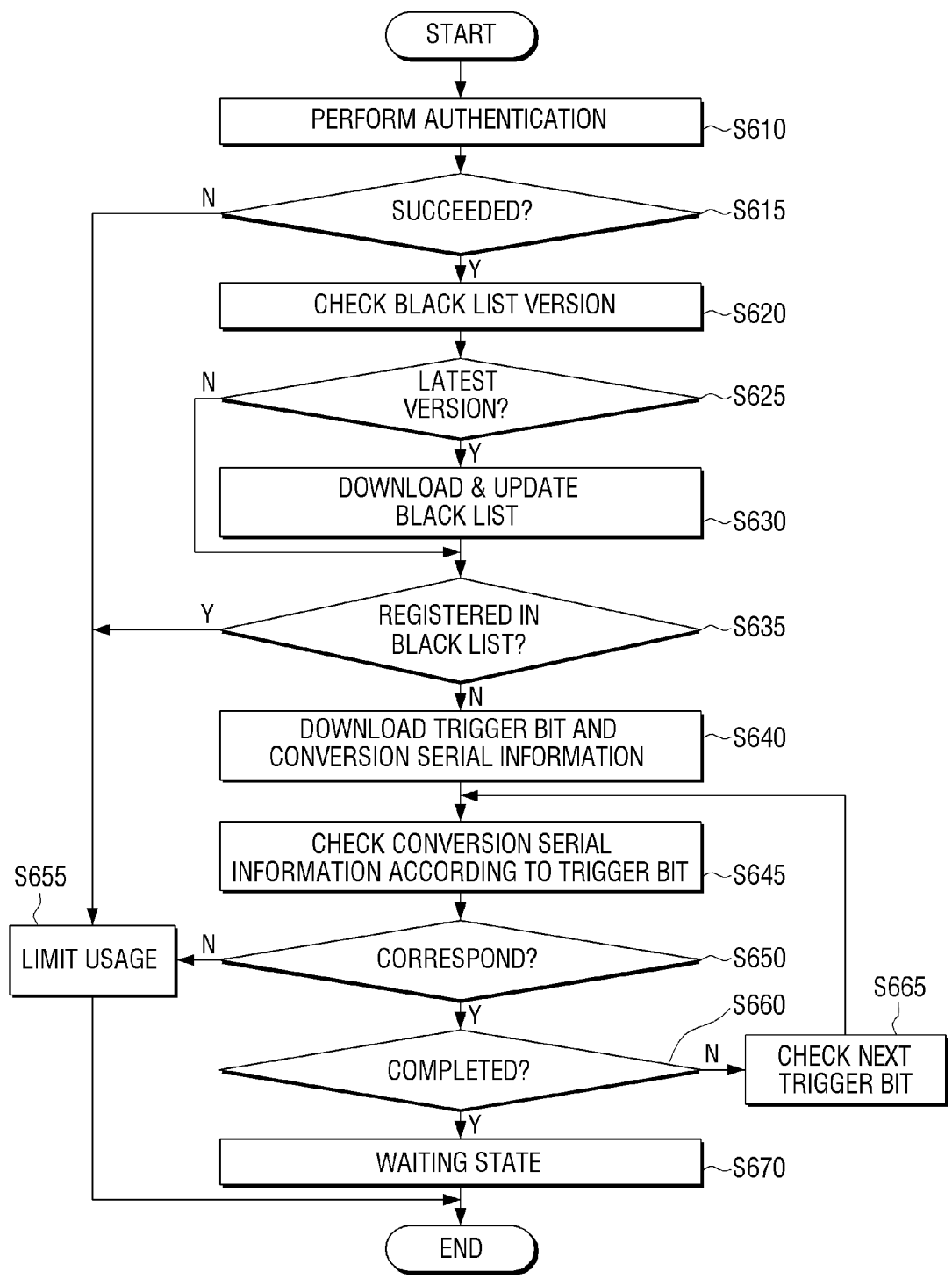
FIG. 6 is a flowchart for specifically explaining a consumable unit verifying method of an image forming device according to an exemplary embodiment.

FIG. 6 is a flowchart for explaining a consumable unit verifying method of an image forming device according to an exemplary embodiment. According to FIG. 6, the image forming device 100 is fitted with a consumable unit, and when a predetermined authentication event occurs, performs authentication of the consumable unit 200. (S610)

For example, the controller 110 may encode the signal for authentication and transmit the signal to the CRUM chip 210. In the transmitted signal, any value R1 may be included. R1 may be a random value randomly created at every authentication, or any predetermined fixed value. When the corresponding signal is received, the CPU 212 of the CRUM chip 210 that received the signal creates a section key using information including the any value R2 and the received R1. The section key refers to an encoding key used during one communication session.

The CPU 212 encodes data using the session key and encoding algorithm and creates MAC (Message Authentication Code). In the encoded data, various information on the consumable unit 200 and CRUM unit 210 may be included. For example, electronic signature information or serial number may be included. For simplicity of explanation, the MAC created the foremost will be called the first MAC.

The CPU 212 transmits the signal with the data including R2 and the first MAC combined to the controller 110. R2 may be a value that the CPU randomly creates, or any fixed value. The controller 110 creates a session key using the received R2 and R1, and creates the second MAC using the created session key. In addition, the created second MAC is compared to the first MAC included in the received signal to authenticate the CRUM chip 210. In the case where an OS executed separately from the main body is stored in the memory 213, the CPU 212 may use the OS to perform the R2 creating operation, session key creating operation, first MAC creating operation, and transmitting operation etc. consecutively, and complete authentication.

In an exemplary embodiment, one example of the method of authentication is explained, but authentication may be performed using other methods as well. Especially, instead of using the method of creating MAC information and comparing, it is possible to perform communication between the image forming device and the CRUM chip according to the encoding protocol and share the same information to create authentication and a session key.

Next is an example of such authentication. In the signal that the image forming device 100 transmits in the process of sending data to the CRUM chip 200 for an authentication operation, CMD1, DATA1, CRC1, Symbol, VC1 are included. CMD1 refers to a command. In CMD1, options related to authentication or size information of the data being sent may be included in CMD1. DATA1 includes of Random Data that is data necessary for authentication, encoded related data value for authentication, and certain information stored in the image forming device. In the case of a first authentication process, besides the aforementioned random data R1, key size information and session key related data such as various key related information used in an asymmetric algorithm, and other information stored in the image forming device main body 100 may be transmitted. In some cases, some of this information may be omitted, or replaced by other information.

Random data may be a value that the image forming device 100 randomly creates for authentication. Therefore, random data may differ at every authentication, but in some cases, it may be embodied such that any predetermined fixed value is transmitted instead of random data. CRC1 refers to an error detection code. CRC1 is transmitted to check error of CMD1 and DATA1. Checksum or MAC may be used as an error detection method in addition to the CRC1 method, or used to replace CRC1 method. Besides, there may be additional information in the information to be transmitted.

When information is received from the image forming device, the CRUM chip 200 transmits a response according to the received data back to the image forming device. DATA2, SW2, CRC2, SECU2, VC2 are included in the data transmitted. A first random data R1, second random data R2, chip serial number (CSN), key related information used in an asymmetric key algorithm, and internal information of the CRUM may be included in the DATA.

The first random data R1 is a value received from the image forming device, and the second random data R2 is a value created by the CRUM chip 200. In some cases, these information included in Com-2 may be omitted or replaced by other information.

Besides the above, SW2 refers to a result data that is the result of execution of an operation performed in the CRUM chip 200 as data of the image forming device is received. CRC2 plays the same role as CRC1, and thus explanation on CRC2 is omitted. When an authentication process is made as explained above, the first random data R1 created in the image forming device 100 and the second random data R2 created in the CRUM chip 200 may be shared by each other. The image forming device 100 and the CRUM chip 200 may each create a session key using the R1 and R2 received. Otherwise, besides R1 and R2, the image forming device 100 and the CRUM chip 200 may each create the same session key using the information shared between the image forming device and the CRUM chip.

As such, according to various exemplary embodiments, in such an authentication process, electronic signature information or key information may be transceived and used in the authentication.

Besides, authentication may be performed in various ways.

When the authentication fails (S615), the image forming device 100 limits use of the consumable unit 200 where the corresponding CRUM chip 210 is fitted (S655).

When the authentication succeeds (S615), the image forming device 100 checks the version of the detection list stored in the CRUM chip 210 (S620).

As a result of the checking, if the version of the detection list stored in the CRUM chip 210 is a latest version than the detection list stored in the main body (S625), the controller 110 downloads the detection list from the CRUM chip 210, and updates the detection list prestored in the storage 120 (S630). On the other hand, if the version of the detection list stored in the CRUM chip 210 is not a latest version than the detection list stored in the main body, the controller 110 does not download the detection list separately, but maintains the existing detection list.

In the case where the detection list is updated or the existing detection list is maintained, the controller 110 verifies the consumable unit 200 based on that detection list (S635). That is, the controller determines whether or not the serial information stored in the CRUM chip 210 is already registered in the detection list, and if it is determined that the serial information stored in the CRUM chip 210 is already registered in the detection list, the controller determines it to be a verification failure and limits the usage (S655).

On the other hand, if it is determined that the serial information stored in the CRUM chip 210 is not registered in the detection list, the controller performs verification based on the conversion serial information list. More specifically, the controller 110 may download the conversion serial information list from the CRUM chip, perform a logical operation such as bit OR regarding the trigger bit prestored in the storage 120 and the trigger bit included in the conversion serial information list downloaded from the CRUM chip, and have the result as a new trigger bit. The controller 110 may check the new trigger bit, check at least one conversion serial information among the conversion information list, convert the serial information of the CRUM chip according to rules corresponding to the selected conversion serial information, and compare the converted result value with the selected conversion serial information to perform a second verifying of the CRUM chip.

In the case of using both the detection list and conversion serial information list as in the present exemplary embodiment, verification using the detection list may be called a first verifying, and the verification using the conversion serial information list may be called a second verifying, but there is no limitation to the order thereof.

For a verification using the conversion serial information list, the controller 110 first downloads the conversion serial information list including the trigger bit and conversion serial information (S640).

The controller 110 may select at least one conversion serial information among the conversion serial information list based on the trigger bit, and perform verification based on the selected conversion serial information. More specifically, the controller 110 may perform a logical operation such as bit OR logical operation regarding the trigger bit prestored in the storage 120, and the trigger bit included in the downloaded conversion serial information list.

The controller 110 stores the logical operation result value in the storage 120. More specifically, the controller 110 may store the logical result value in a nonvolatile memory such as EEPROM or flash memory of the storage 120.

For example, if the trigger bit stored in the storage 120 of the image forming device 100 is 0111111111 and the trigger bit downloaded from the CRUM chip 210 is 1011111111, its OR logical operation value is 0011111111. The controller 110 stores the result value to the storage 120.

The controller 110 verifies the conversion serial information corresponding to the bit having a certain value (for example 0) in the logical operation result value stored in the storage 120 (S645).

In the case where 0011111111 is stored in the storage 120 as aforementioned, the controller 120 performs verification regarding the first and second conversion serial information. For example, if the serial number of the consumable unit 200 is 1234567890 as aforementioned, and the first rule is shifting each value to the right, the controller 110 may convert its serial number into 0123456789 according to the corresponding rule. The controller 110 compares the conversion result value with the first conversion serial information included in the conversion serial information list (S645).

If as a result of comparison the conversion result value is not identical to the value registered in the conversion serial information list (S650), the controller 110 processes the verification being a failure, and limits using the corresponding consumable unit (S655).

On the other hand, when the conversion result value is identical to the registered value (S650), the controller 110 checks the next trigger bit stored in the storage 120 (S665) and determines the verification until the entirety of the trigger bit is checked (S660). In the aforementioned example, the next trigger bit is also 0, and thus the controller 110 performs verification regarding the second conversion serial information as well. Therefore, the controller 110 converts the serial information according to the second rule, compares the converted serial information with the second conversion serial information to perform verification.

In this way, the controller 110 checks each trigger bit (S665), and performs verification. When checking the entirety of the trigger bit is completed (S660), the controller 110 determines the verification to be a success and thus falls into a use waiting state (S670).

Otherwise, the controller 110 may use the method of comparison by converting the conversion serial information into serial information in reverse.

In the present example, it is embodied that verification is made to the conversion serial information in the case where the trigger bit included in the serial information list is 0, but it may also be embodied to verify the conversion serial information when trigger bit is 1 and not to verify the conversion serial information in the case where the trigger bit is 0.

According to an exemplary embodiment, in a manufacturer which manufactures an image forming device 100, in the case of producing a CRUM chip 210 and intending to add verification regarding a new conversion serial information, the manufacturer has only to change the trigger bit of the CRUM chip 210. That is, when the trigger bit of the CRUM chip 210 is recorded as 1001111111, as a result of OR logical operation by the controller 110, 0001111111 is stored in the storage 120. Therefore, verification on the third conversion serial information may also be performed.

Although not illustrated in FIG. 6, before performing a verification based on the detection list and a verification based on the conversion serial information list, the controller 110 may further perform a process of verifying the legitimacy of that list. This was explained in detail above, and thus repeated explanation is omitted.

In the aforementioned various exemplary embodiments, it was illustrated and explained that the image forming device 100 includes a controller 110, storage 120, and consumable unit 200, but the image forming device 100 may further include various configurative elements, and some of the configurative elements may be omitted or changed according to embodiment examples.

Figure 7:
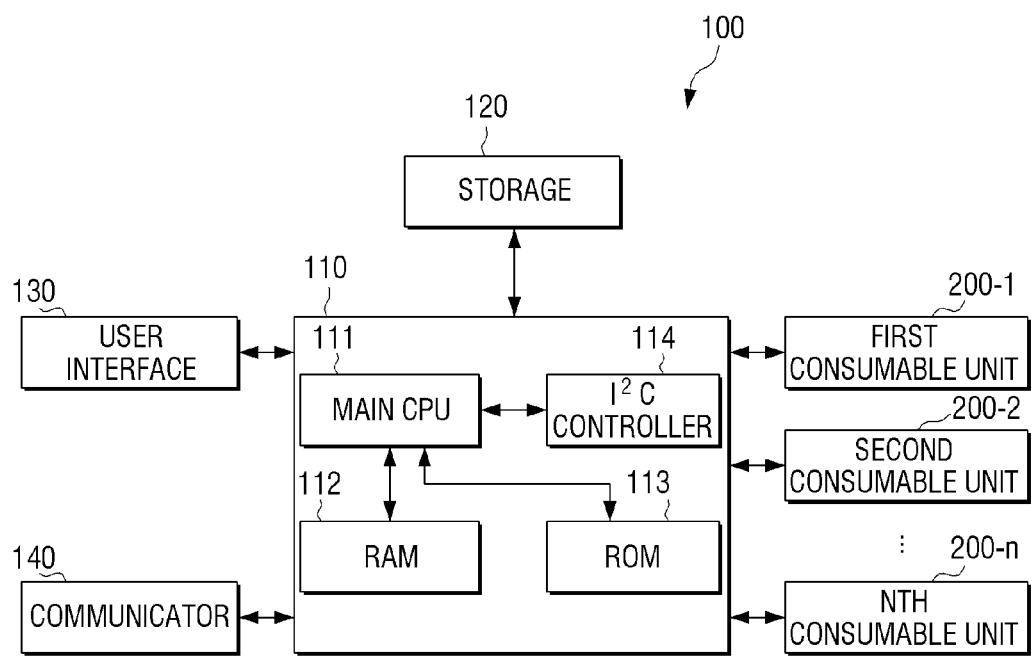
FIG. 7 is a block diagram illustrating an example of a detailed configuration of an image forming device according to an exemplary embodiment.

FIG. 7 is a block diagram for explaining a configuration of an image forming device according to an exemplary embodiment of the present disclosure. According to FIG. 7, the image forming device 100 includes a controller 110, storage 120, user interface 130, communicator 140, and a plurality of consumable units 200-1, 200-2, . . . , 200-n.

Any repetitive explanation on the controller 110, storage 120, and consumable units 200-1, 200-2, . . . , 200-n as that aforementioned will be omitted.

The user interface 130 plays a role of receiving various commands from the user or displaying various information. The user interface 130 may include an LCD or LED display, at least one button, and speaker etc., and in some cases a touch screen.

The communicator 140 refers to a configuration connected to various external devices such as an external server apparatus or host PC via wires or wireless. The communicator 140 may perform communication through various kinds of interfaces such as a local interface, USB (Universal Serial BUS) interface, and wireless communication network etc.

The controller 110 controls overall operations of the image forming device based on various programs and data stored in the storage 120.

More specifically, the controller 110 processes data according to the command received through the communicator 140 or user interface 130, and converts it into a format where image formation can be made.

Next, the controller 110 performs an image forming job regarding the data converted using the plurality of consumable units USB 200-1, 200-2, . . . , 200-n. The consumable units may be provided in various formats according to different kinds of the image forming device. As aforementioned, in the case of a laser printer, not only an electric charge unit, developing unit, transcription unit, light exposure unit, and settlement unit, but also various replaceable units such as a roller, belt, and OPC drum etc. may be included.

The controller 110 may perform authentication regarding the consumable unit where the CRUM chip is fitted inside, or perform verification based on at least one of the detection list and conversion serial information list.

In the authentication process, the controller 110 may perform operations for creating a common session key between the controller 110 and the CRUM chip 210. In addition, in the authentication process, the controller 110 may check whether or not it is state where the fitted CRUM chip 210 can be normally used. For example, the controller 110 may reset the CRUM chip 210 and read the data and check the data, or send additional commands, analyze the result of response to the commands in the CRUM chip 210, and determine whether or not it is usable. In this process, it is possible to confirm whether or not the communication is performed well, and whether or not it is a CRUM chip 210 suitable to the corresponding image forming device.

In some cases, it is possible to check whether the CRUM chip 210 is at a state prepared for performing encoded communication with the image forming device, for example checking whether or not the key information used in the encoded communication is inside the CRUM chip. The key information used during authentication is not included during the initial manufacturing of the chip but may be inserted through a process of issuance in the next manufacturing process. Code authentication may be passed only when key insertion is completed. Accordingly, code keys may differ per model of the image forming device or CRUM chip.

Besides, as aforementioned, the controller 110 may transmit various information such as random data 1, data necessary for code authentication protocol, and feature information of the image forming device to the CRUM chip 210. Accordingly, the controller 110 checks the random data 2 responding in the CRUM chip 210, additional data necessary for the code authentication protocol, and feature information of the CRUM chip 210 etc. In this process, authentication is made, and the image forming device and the CRUM chip turn out to have the same information. Based on this information, it is possible to create a session key to be used in the next code communication. The code protocol used in an authentication may be a symmetric key algorithm, an asymmetric key algorithm, or both in combination.

When the authentication and verification regarding the consumable unit succeeded, the controller 110 may perform data communication with the CRUM chip. In this case, the controller may perform encoded data communication using the session key created in the authentication process.

For example, the controller 110 may encode various data or commands and transmit encoded communication messages, likewise, the CRUM chip may response by encoded communication messages. MAC may be used in encoded communication messages as well. For example, when creating a communication message to be transmitted to the CRUM chip 210, the controller 110 applies the key and code algorithm to the data and creates a third MAC. Next, the controller 110 may attach the third MAC to the communication message and send it to the CRUM chip 210. The CRUM chip 210 extracts the data portion from the transmitted communication message, and creates applies the aforementioned key and code algorithm to create a fourth MAC. The CRUM chip 210 compares the third MAC detected in the transmitted communication message and the fourth MAC created by the CRUM chip 210. And if they are found to be identical to each other, it is regarded as a legitimate communication message, and an operation corresponding to that message is performed. For example, when an image forming job is performed, the consumed toner amount, number of pages, operation time, and operation details of the job may be recorded in the memory 213. But if they are found to be different from each other, the CPU 121 may regard the corresponding message as an illegitimate communication message and delete it.

Besides the MAC explained above, various message verification methods of communication messages such as CheckSum, CRC may be used to check whether or not a communication message is legitimate, and thus there is no limitation to MAC.

Furthermore, the entirety or portion of the data to be transmitted is encoded using the session key created in the preexecuted authentication process, decodes the received data using the session key at the receiving side and performs the corresponding command, and if the received data is not decoded normally, the operations of the image forming device 100 is limited or error messages are shown or predetermined operations are made.

According to FIG. 7, the controller 110 may include configurative elements such as a main CPU 111, RAM 112, ROM 113, and I2C controller ($I^2C$ controller) 114.

The main CPU 111 may control the operations of the image forming device using various programs stored in the storage 120. For example, when the power is turned on, the main CPU 111 accesses the storage 120, and uses the O/S stored in the storage 120 to perform booting. In addition, various operations are performed using various programs, contents, and data stored in the storage 120.

In the ROM 113, command sets etc. for system booting are stored. When a turn on command is input and power is supplied, the main CPU 111 copies the O/S stored in the storage 120 to the RAM 112 according to the command stored in the ROM 113, and executes the O/S to boot the system. When the booting is completed, the main CPU 111 copies various programs stored in the storage 120 to the RAM 112, and executes the programs copied in the RAM 112 to perform various operations.

The I2C controller ($I^2C$ controller) 114 is a configurative element which may be provided when the main body of the image forming device 100 and the consumable unit 200 perform communication by I2C interface. The I2C controller 114 plays the master role, and the CRUM chips of each consumable unit 200 plays the slave role.

The main CPU 111 downloads the detection list and the conversion serial information list of the consumable unit 200 using the I2C controller ($I^2C$ controller) 114, and stores it in the storage 120. And based on this, the main CPU 111 may perform verification. Detailed explanation on the verification method was made above and thus detailed explanation will be omitted.

As illustrated in FIG. 7, in the case where the image forming device 100 includes a communicator 140, the controller 110 may receive at least one of the detection list and conversion serial information list from an external server apparatus through the communicator 140.

The controller 110 may store the detection list and the conversion serial information list provided by the server apparatus (not illustrated) in the storage 120, and based on this, the controller 110 may verify the consumable unit 200.

In addition, as a result of verifying the consumable unit 200, the controller 110 may transmit at least one of various information such as the detection list, conversion serial information list, and serial information provided from the consumable unit 200, to the server apparatus (not illustrated). Based on these information, the server apparatus may easily understand the distribution status of nongenuine consumable units.

Figure 8:
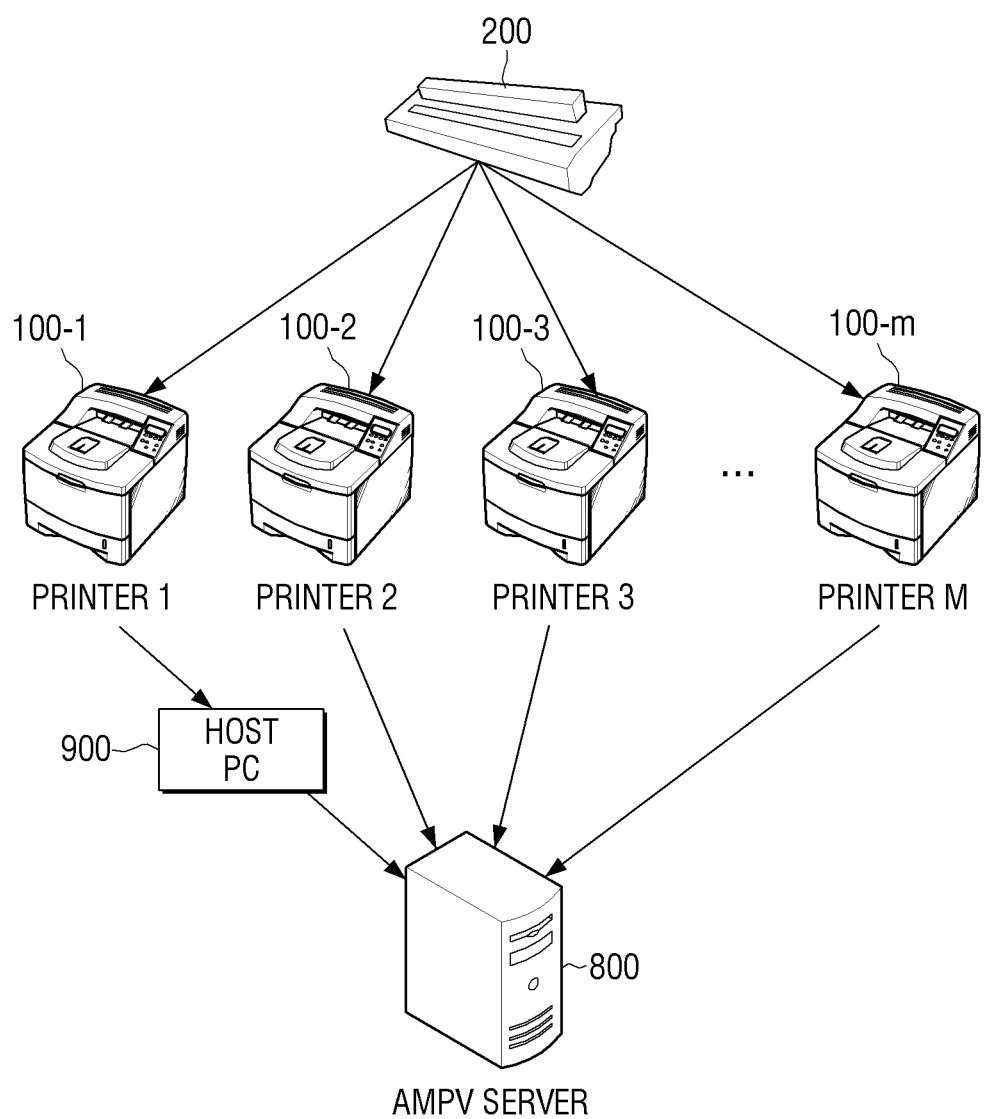
FIG. 8 is a view illustrating a configuration of a network system according to an exemplary embodiment.

FIG. 8 is a view illustrating a configuration of a network system according to an exemplary embodiment of the present disclosure. According to FIG. 8, the network system includes a plurality of image forming devices 100-1~100-m, and a server apparatus 800 managing them.

The server apparatus 800 may receive information directly from each image forming apparatus 100-1~100-m, but may instead receive the information of the image forming apparatuses 100-1~100-m through a host connected to each image forming device.

In the case of using a host PC (personal computer) 900, the host PC 900 may request the image forming device 100-1 for consumable unit information, detection list information, conversion serial information list, and verification result etc. stored in the CRUM chip 210 when certain conditions are satisfied.

The image forming device 100 may transmit these information by the request of the host PC 900. The transmitted information is transmitted back the server apparatus 800.

Otherwise, information may be transmitted to the server apparatus 800 directly using the functions of the image forming device 100. For example, after printing by the image forming device 100, information of the consumable unit fitted to the host PC that made the printing command and the conversion serial information are sent in a predetermined format. When the corresponding information enters, the host PC 900 transmits the information to the predetermined server apparatus. When the information cannot be sent directly to the server apparatus 800, the information may be sent to other servers or image forming devices or PC that may send the information to the server apparatus 800.

The server apparatus 800 may collect these information and manage them.

In addition, the server apparatus 800 may analyze the data transmitted to the server and check whether or not there exists a nongenuine chip. For example, the server apparatus 800 may investigate the number of consumable units having the same conversion serial information and the same consumable unit information. A consumable unit having the same information are not made by more than a certain number, and thus when more than a certain number of consumable units exist, the consumable units having that serial information may be regarded as nongenuine consumable units. Besides the aforementioned, there may be used a method of analyzing the various collected information to distinguish between genuine products and nongenuine products.

As aforementioned, in the case where the serial information of the consumable unit and the conversion serial information verified in the image forming device are the same, the manufacturer of the image forming device 100 may change the value of the trigger bit of the CRUM chip 210 fitted in the consumable unit 200, and have additional conversion serial information verified besides the conversion serial information that used to be verified.

Otherwise, when the serial information of the consumable unit and all conversion serial information are the same when checked in the server apparatus 800, it may be regarded that a genuine CRUM chip having the corresponding information has been copied and used. In this case, it is possible to add the serial information (for example: Toner Serial Number) of the consumable unit corresponding to the CRUM chip of that consumable unit to the detection list. Accordingly, the consumable units having the corresponding information may be identified as nongenuine chips in the image forming device.

FIG. 9 illustrates an example of a configuration of a database managed in the server apparatus 800. According to FIG. 9, the server apparatus 800 may arrange and manage various information such as the chip serial number (CSN), toner serial number (TSN) and conversion serial information etc. used in various image forming devices put to market in one database table.

When information of each image forming device is collected, the server apparatus 800 may use the information to create and update the database table. For example, since the toner serial number is serial information of the consumable unit, this information could not be in numerous consumable units at the same time. Therefore, if there are more than a certain number of identical serial number, it can be seen that there is an illegally produced CRUM chip inside the consumable unit having the corresponding toner serial number. For example, if 10 or more identical serial numbers have been found, it can be determined that the CRUM chip having the corresponding serial number has been copied or hacked.

The operator of the server apparatus 800 may add the serial information of the CRUM chip determined to have been copied or hacked to the detection list and update the detection list. In addition, regarding the newly produced consumable unit 200, the updated version detection list may be stored. Otherwise, the updated detection list may be downloaded in each image forming apparatus 100-1~100-m. Accordingly, in an image forming device that stored a new detection list, it is possible to limit use of the newly discovered nongenuine consumable unit.

Otherwise, the operator of the server apparatus 800 may set at least one of the trigger bits included in the conversion serial information list of the newly produced consumable units to 0. In this case, the image forming device where the newly consumable unit is fitted verifies the conversion serial information corresponding to the bit stored as 0 in the new IBL trigger bit. Upon verifying the conversion serial information, the nongenuine chip produced without knowing the conversion rule of the corresponding bit does not have the same conversion value as the value included in the conversion serial information list. Therefore, the image forming device processes that verification regarding the consumable unit where the corresponding CRUM chip is fitted to be a failure.

In the present example, the verification is made regarding the conversion serial information in the case where the trigger bit included in the serial information list is 0, but it may also be embodied to verify the corresponding conversion serial information when the trigger value is 1 and not to verify the corresponding conversion serial information when the trigger value is 0.

Figure 10:
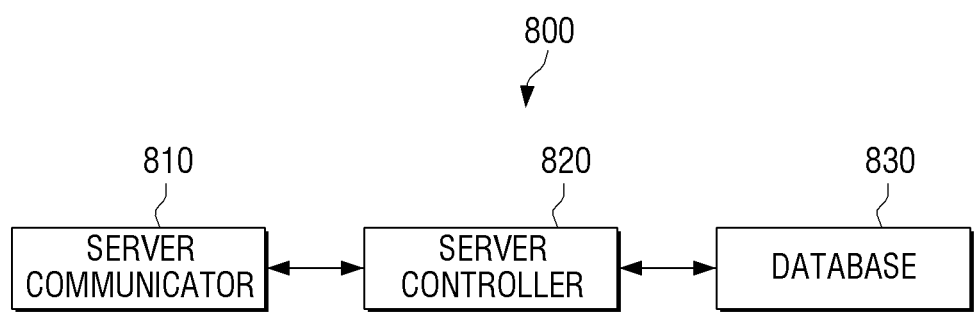
FIG. 10 is a block diagram illustrating a configuration of a server apparatus according to an exemplary embodiment.

FIG. 10 is a block diagram illustrating a configuration of a server apparatus according to an exemplary embodiment of the present disclosure. According to FIG. 10, the server apparatus 800 includes a server communicator 810, server controller 820, and database 830.

The server communicator 810 is a configurative element for performing communication with various external apparatuses such as a plurality of image forming devices or host PC etc. The server communicator 810 may collect various information received from each external apparatus.

The database 830 is a configurative element for storing the nongenuine product management information. More specifically, the database 830 may store a database table as illustrated in FIG. 9.

When verification regarding each consumable unit is performed in each of the image forming apparatus, the server controller 820 may receive the verification result and update the nongenuine management information. That is, as aforementioned, when a consumable unit including a CRUM chip is fitted, each image forming device 100 may verify the CRUM chip using at least one of the detection list and the conversion serial information list. In addition, the server controller 820 may provide the verification result showing various information obtained in the verifying process or whether or not the verification failed to the server apparatus 800.

The server controller 820 may update the data stored in the database 830 based on these information.

Figure 11:
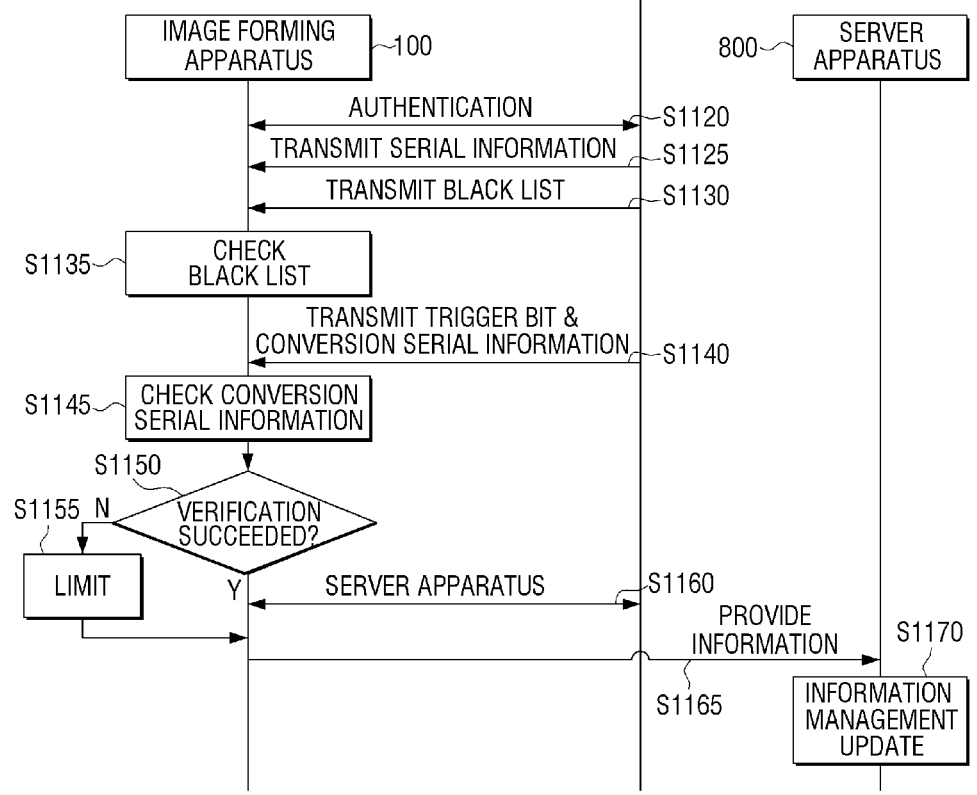
FIG. 11 is a timing view for explaining a consumable unit managing method in a network system according to an exemplary embodiment.

FIG. 11 is a view for explaining operations performed inside a network system in the case where a CRUM chip is produced and provided.

In FIG. 11, the manufacturing steps and provision steps of the CRUM chip 210 are explained separately. First, in the manufacturing steps, in an issuance application 1110, various serial information including the toner serial numbers to be allocated to the corresponding CRUM chip 210 is created and provided to the issuance firmware 1120 (S1100). The issuance firmware 1120 converts the created serial information according to the predetermined rules, and creates the conversion serial information (S1105). The issuance firmware 1120 provides the created conversion serial information, serial information, and trigger bit etc. to the CRUM chip 210 (S1110). The CRUM chip 210 may be put to market with it storing various information provided (S1115). FIG. 11 explained only information related to the conversion serial information list, but the detection list may also be stored in the CRUM chip 210 in the same manner.

In this state, the user may purchase the consumable unit 200 where a CRUM chip 210 is fitted, and fit the consumable unit 200 into the user's image forming device 100.

When the consumable unit 200 is fitted, the controller 110 performs authentication as aforementioned (S1120), and may receive the serial information and detection list of the CRUM chip 210 (S1125, S1130). The controller 110 checks the received detection list (S1135), and performs a first verification. After the first verification, the controller 110 may receive the trigger bit and the conversion serial information (S1140). Then, the controller 110 may perform a second verification based on the trigger bit and the conversion serial information (S1145).

When the first and second verifications all succeed (S1150), the controller 110 may perform data communication between the controller 110 and the CRUM chip 210 (S1160). On the other hand, if even one of the first and second verifications fails (S1155), the controller 110 limits use of the consumable unit (S1155).

The controller 110 may transmit various information obtained in the verification process to the server apparatus 800 (S1165). The server apparatus 800 may update the management information using the transmitted information (S1170).

As aforementioned, the consumable unit 200 may be attached to and detached from the main body of the image forming device 100. When being fitted, the consumable unit 200 must be electrically connected to the main body. This connection may be embodied in a contact type or connector type.

Figure 12:
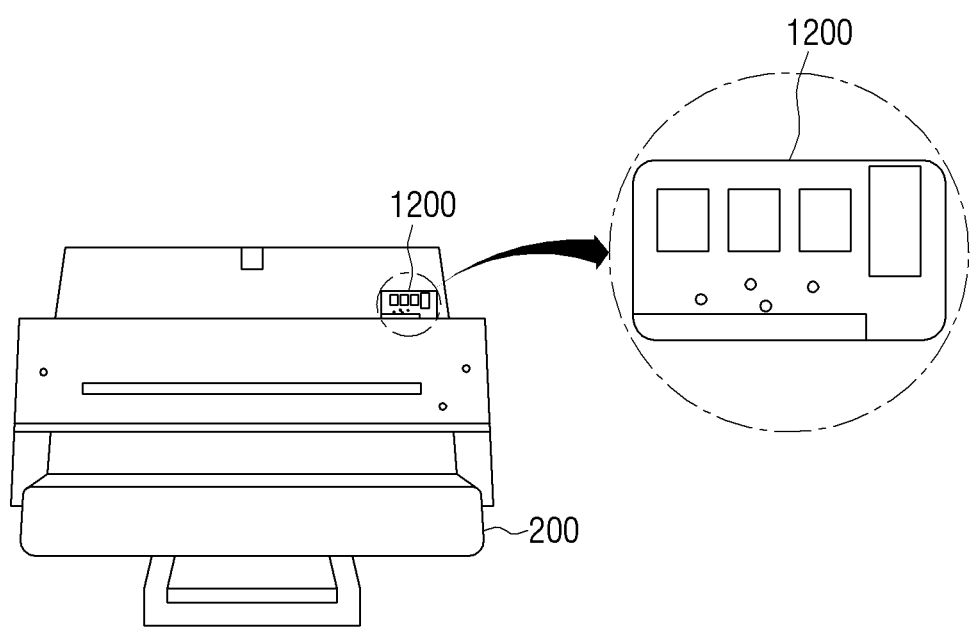
FIGS. 12 and 13 are views illustrating examples of various connecting structures between a consumable unit and an image forming device main body.

FIG. 12 is an example of an exterior configuration of a consumable unit 200 embodied in a contact type. According to FIG. 12, the consumable unit 200 includes a contact point 1200 for communication. FIG. 12 illustrates a case where 12C interface using four contact terminals are used. Also in the main body 100 of the image forming device, a contact point of the same shape as the contact point 1200 is provided. When the consumable unit 200 is fitted to the main body 100, the contact point 1200 may contact the contact point provided in the main body 100 of the image forming device 100.

When a contact signal is received from the contact point, the controller 110 of the image forming device 100 may consecutively perform the authentication and verification steps.

Figure 13:
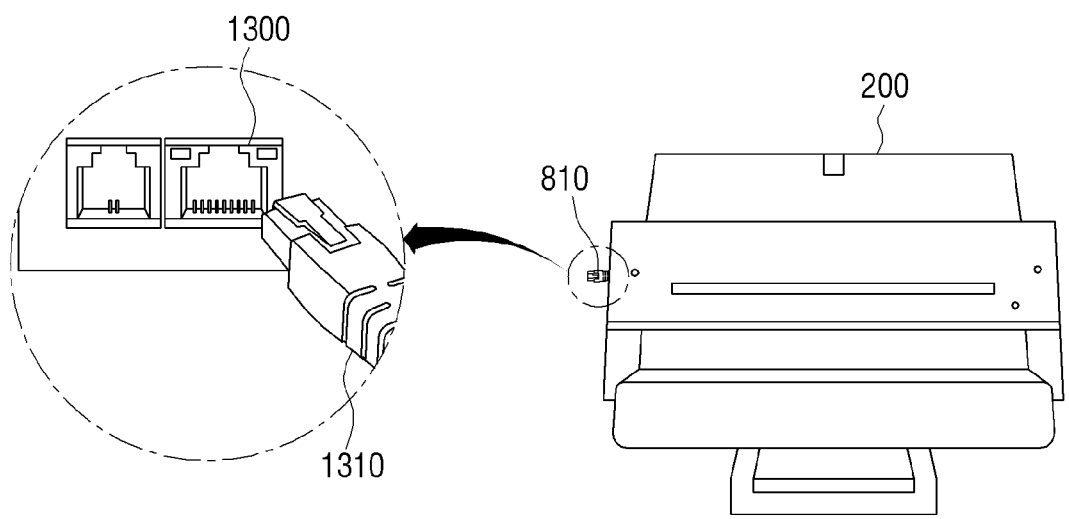

FIG. 13 is a view illustrating an example of an exterior configuration of an interface of a connector type. According to FIG. 13, the consumable unit 200 includes a connector 1310. The connector 1310 is connected to the port 1300 provided in the main body 100 of the image forming device. The controller 110 of the image forming device 100 may consecutively perform the authentication and verification steps when the connection signal of the connector 1310 is received through the port 1300.

As aforementioned, the consumable unit 200 may be configured in various formats. In addition, the CRUM chip 210 may also be configured in various formats according to the type of the consumable unit 200.

Figure 14:
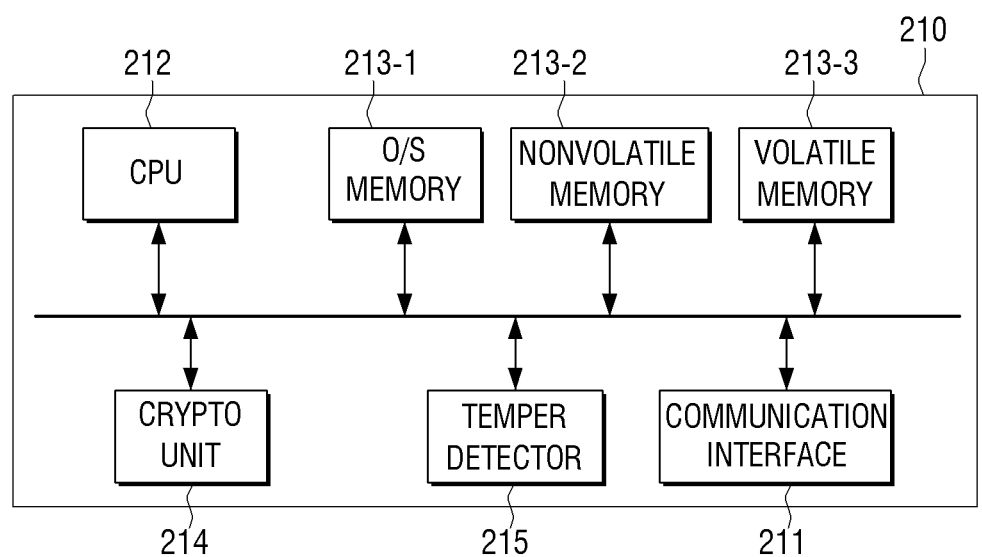
FIG. 14 is a block diagram illustrating an example of a detailed configuration of a CRUM chip according to an exemplary embodiment.

FIG. 14 is a block diagram illustrating an example of a configuration of a CRUM chip 210.

According to FIG. 14, the CRUM chip 210 may include various elements such as a communication interface 211, CPU 212, O/S memory 213-1, nonvolatile memory 213-2, volatile memory 213-3, crypto module 214 (crypto unit 214), and temper detector 215.

Although not illustrated in FIG. 14, inside the CRUM chip 210, a cluck (not illustrated) that outputs a cluck signal or a random value generator (not illustrated) that generates a random value for authentication may be further included, and some elements may be removed or other elements may be further included.

According to FIG. 14, the O/S memory 213-1 stores O/S for driving the consumable unit 200. In the nonvolatile memory 213-2, various data and programs related to a consumable unit and CRUM chip may be stored. More specifically, electronic signal information, various encoding program codes, state information of consumable unit (for example, remaining toner amount information, replacing time information, remaining number of printable paper etc.), serial information (for example, manufacturer information, manufacturing date information, serial number, and product model name information), A/S information etc. may be stored in the nonvolatile memory 213-2.

The CPU 212 may load the programs and data stored in the nonvolatile memory 213-2 to the volatile memory 213-3, and use the same.

The crypto unit 214 may support the encoding algorithm to enable authentication between the crypto unit 214 and the controller 110 provided in the main body of the image forming device or encoded communication. More specifically, the crypto unit 214 uses the various encoding algorithms to perform authentication or encoding data communication.

The temper detector 215 is a unit for preventing various physical hacking attempts that is tempering. More specifically, it monitors regarding the voltage, temperature, pressure, light, and frequency, and if there is an attempt such as a Decap, deletes the data or physically blocks the data. In this case, the temper detector 215 may have an additional power.

In FIG. 4 and FIG. 14, there is illustration of the CRUM chip 210 including the CPU 212, but the configuration of the CRUM chip 210 is not limited thereto. For example, the CRUM chip 210 may include only a memory.

As aforementioned, according to various exemplary embodiments of the present disclosure, the image forming device may use at least one of the detection list and conversion serial information list to verify the consumable unit. Accordingly, it is possible to limit use of a nongenuine chip. In addition, a manufacturer or seller of the image forming device may collect information on the CRUM chip and check whether or not the nongenuine chips are used in the market. If nongenuine chips or units are being used, it is possible to limit use of the nongenuine units without developing a new CRUM chip or changing the firmware. Accordingly, it is possible to quickly take action to prevent problems of accident, quality deterioration or damage.

The aforementioned exemplary embodiments were based on consumable units or CRUM chips mounted on image forming devices or apparatuses, but these methods are not limited to use in image forming devices.

That is, in the case of verifying configurative elements mounted inside or external elements in a general electronic apparatus, the aforementioned various exemplary embodiments may be applied. For example, an external storage medium may be connected through a USB cable for a mobile phone, PC, tablet PC, laptop PC, and TV etc. In this case, the controller provided inside the terminal device may verify whether or not the external storage medium is a legitimate apparatus based on the at least one of the detection list and conversion serial information list.

In addition, the various methods explained in the aforementioned various exemplary embodiments may be performed by programs stored in nontransitory computer readable medium. A nontransitory computer readable medium refers to a computer readable medium that may store data semi permanently and not temporarily such as a register, cache and memory. These various applications or programs may be provided in a nontransitory computer readable medium such as a CD, DVD, hard disk, blue ray disk and memory card and ROM etc.

More specifically, when the verifying of the consumable unit based on at least one of the detection list including the information on the nongenuine CRUM chip and the serial information list including the plurality of conversion serial information converted from the predetermined plurality of different rules fails, a nontransitory computer readable medium where a program code for performing the steps of limiting use of the consumable unit is stored may be used.

Processes, functions, methods, and/or software in apparatuses described herein may be recorded, stored, or fixed in one or more non-transitory computer-readable storage media (computer readable recording medium) that includes program instructions (computer readable instructions) to be implemented to cause one or more processing elements to execute or perform the program instructions. Examples of processing elements include controllers, ASICs, CPUs, processors, and the like. The media may also include, alone or in combination with the program instructions, data files, data structures, and the like. The media and program instructions may be those specially designed and constructed, or they may be of the kind well-known and available to those having skill in the computer software arts. Examples of program instructions include machine code, such as produced by a compiler, and files containing higher level code that may be executed by the computer using an interpreter. In addition, a non-transitory computer-readable storage medium may be distributed among devices and computer-readable codes or program instructions may be stored and executed in a decentralized manner by processing elements such as controllers, ASICs, CPUs, processors, and the like.

Although a few embodiments have been shown and described, it would be appreciated by those skilled in the art that changes may be made to these embodiments without departing from the principles and spirit of the disclosure, the scope of which is defined in the claims and their equivalents.

What is claimed is:

1. A Customer Replaceable Unit Monitoring (CRUM) chip comprising:
  an interface configured to perform communication with an image forming device; and
  a memory configured to store information for verifying of a consumable unit, the information including serial information of the CRUM chip and a conversion serial information list including pieces of conversion serial information each of which is converted from the serial information according to a plurality of different predetermined rules,
  wherein at least one piece of the information is provided to the image forming device using the interface for verifying of the consumable unit, and
  wherein the conversion serial information list further comprises a trigger bit to designate at least one piece of conversion serial information to be used in verifying among pieces of conversion serial information.

2. An image forming device comprising:
  a main body;
  a consumable unit, which is detachable from the main body and attachable to the main body;
  a Customer Replaceable Unit Monitoring (CRUM) chip configured to store information for verifying of a consumable unit, the information including serial information of the CRUM chip and a conversion serial information list including pieces of conversion serial information each of which is converted from the serial information according to a plurality of different predetermined rules;
  a storage which stores the conversion serial information list received from the CRUM chip; and
  a controller configured to limit use of the consumable unit, when verifying the consumable unit based on at least one of the pieces of the conversion serial information fails, wherein the conversion serial information list further comprises a trigger bit for designating at least one piece of conversion serial information to be used in the verifying among the pieces of conversion serial information.

3. The image forming device according to claim 2, wherein the CRUM chip comprises:
   a memory configured to store the serial information and the conversion serial information list; and
   a central processing unit (CPU) configured to provide the conversion serial information list to the controller, when the consumable unit is installed in the main body, and
   wherein the controller stores the detection list and the conversion serial information list provided from the CPU to the storage.

4. The image forming device according to claim 2, wherein:
   the CRUM chip further stores version information of a detection list,
   the controller checks a version of the detection list stored in the CRUM chip, and if the version is a latest version than a detection list prestored in the storage, the controller updates the detection list pre-stored in the storage by the detection list stored in the CRUM chip.

5. The image forming device according to claim 2, wherein:
   the controller is operable to authenticate the consumable unit according to a predetermined authentication algorithm corresponding to the trigger bit.

6. The image forming device according to claim 2, wherein:
   the CRUM chip further stores version information of a detection list,
   wherein the controller is operable to check the version of the detection list stored in the CRUM chip, and if the version is a later version than a detection list pre-stored in the storage, updates the detection list pre-stored in the storage by the detection list stored in the CRUM chip.

7. The image forming device according to claim 2, further comprising:
   a communicator configured to perform communication with a server apparatus,
   wherein the controller transmits at least one piece of the serial information of the CRUM chip, the conversion serial information list of the CRUM chip and a result of verifying the consumable unit to the server apparatus.

8. The image forming device according to claim 2, wherein the detection list comprises
   at least one of toner serial information, chip serial information, and serial number of the counterfeit CRUM chips, data recorded in a certain address inside a CRUM memory, and random data used during authentication.

9. A consumable unit verifying method of an image forming device where a consumable unit including a Customer Replaceable Unit Monitoring (CRUM) chip may be attached thereto and detached therefrom, the method comprising:
   verifying the consumable unit based on at least one of a conversion serial information list including pieces of conversion serial information each of which is converted from serial information stored in the CRUM chip according to a plurality of different predetermined rules; and
   limiting use of the consumable unit, when the verifying the consumable unit fails,
   wherein the conversion serial information list further comprises a trigger bit to designate at least one among the plurality of different rules.

10. The method according to claim 9, further comprising:
    performing verifying the CRUM chip according to a predetermined authentication algorithm when the consumable unit is installed in the main body,
    wherein the verifying the consumable unit is performed after the authentication succeeds.

11. The CRUM chip according to claim 1, wherein the trigger bit configured to a bit string corresponding to number of the pieces of conversion serial information.

12. The CRUM chip according to claim 1, wherein the information stored in the memory further includes a detection list to verify one or a plurality of certain CRUM chip and to compare with the serial information of the CRUM chip.

13. The CRUM chip according to claim 12, wherein the memory further stores version information of the detection list, the version information to be used in checking whether or not the detection list stored in the memory to be updated.

14. The CRUM chip according to claim 12, wherein the detection list includes at least one of toner serial information, chip serial information, and serial number of the nongenuine CRUM chips, data recorded in a certain address inside a CRUM memory, and random data used during authentication.

15. The image forming device of claim 5, wherein the controller is operable to convert the serial information of the CRUM chip according to rules corresponding to the designated conversion serial information and to authenticate the consumable unit by comparing the converted result value and the designated conversion serial information.

16. The image forming device of claim 2, wherein the storage further stores a detection list to verify one or a plurality of certain CRUM chip,
    wherein the controller is operable to authenticate the consumable unit by checking whether or not information corresponding to the serial information registered in the detection list.

17. The image forming device of claim 5, wherein the storage further stores a detection list to verify one or a plurality of certain CRUM chip,
    wherein the controller is operable to authenticate the consumable unit by checking whether or not information corresponding to the serial information registered in the detection list.

18. The image forming device of claim 6, wherein the storage further stores a detection list to verify one or a plurality of certain CRUM chip,
    wherein the controller is operable to authenticate the consumable unit by checking whether or not information corresponding to the serial information registered in the detection list.

19. The image forming device of claim 7, wherein the storage further stores a detection list to verify one or a plurality of certain CRUM chip,
    wherein the controller is operable to authenticate the consumable unit by checking whether or not information corresponding to the serial information registered in the detection list.

20. A consumable apparatus, comprising:
    a consumable part that includes a mount and that is mountable on an image forming apparatus; and the CRUM chip of claim 1 mountable on the mount of the consumable part.

21. The consumable apparatus according to claim 20, wherein the consumable part is any one of an electrification part, a light exposure part, a developing part, a transfer part, a settlement part, a roller, a belt, and an OPC drum.

22. A communication method of a Customer Replaceable Unit Monitoring (CRUM) chip, the method comprising:
  creating communication session with a main body when a consumable unit is installed to the main body; and
  providing information for verifying of the consumable unit to the main body,
  wherein the information including a conversion serial information list including pieces of conversion serial information each of which is converted from a serial information of CRUM chip according to a plurality of different predetermined rules, and
  wherein the conversion serial information list further comprises a trigger bit to designate at least one among the plurality of different rules.

23. A Customer Replaceable Unit Monitoring (CRUM) chip comprising:
  an interface configured to perform communication with an image forming device; and
  a memory configured to store information for verifying of a consumable unit, the information including serial information of the CRUM chip and a conversion serial information list including pieces of conversion serial information each of which is converted from the serial information according to a plurality of different shifting operations,
  wherein at least one piece of the information is provided to the image forming device using the interface for verifying of the consumable unit,
  wherein the conversion serial information list further comprises a trigger bit to designate at least one piece of conversion serial information to be used in verifying among pieces of conversion serial information, and
  wherein the trigger bit is configured to a bit string corresponding to a number of the pieces of conversion serial information.

24. A Customer Replaceable Unit Monitoring (CRUM) chip comprising:
  an interface configured to perform communication with an image forming device; and
  a memory configured to store information for verifying of a consumable unit, the information including serial information of the CRUM chip and a conversion serial information list including pieces of conversion serial information each of which is converted from the serial information according to a plurality of different shifting operations,
  wherein at least one piece of the information is provided to the image forming device using the interface for verifying of the consumable unit, and
  wherein the information stored in the memory further includes a detection list to verify one or a plurality of certain CRUM chips and to compare with the serial information of the CRUM chip.

25. The CRUM chip according to claim 24, wherein the memory further stores version information of the detection list, the version information to be used in checking whether the detection list stored in the memory is to be updated.

26. The CRUM chip according to claim 24, wherein the detection list includes at least one of toner serial information, chip serial information, and serial number information of nongenuine CRUM chips, data recorded in a certain address inside a CRUM memory, and random data used during authentication.

* * * * *